Nov. 1, 1938.    E. F. LOWEKE    2,134,791
BRAKE
Filed May 29, 1937
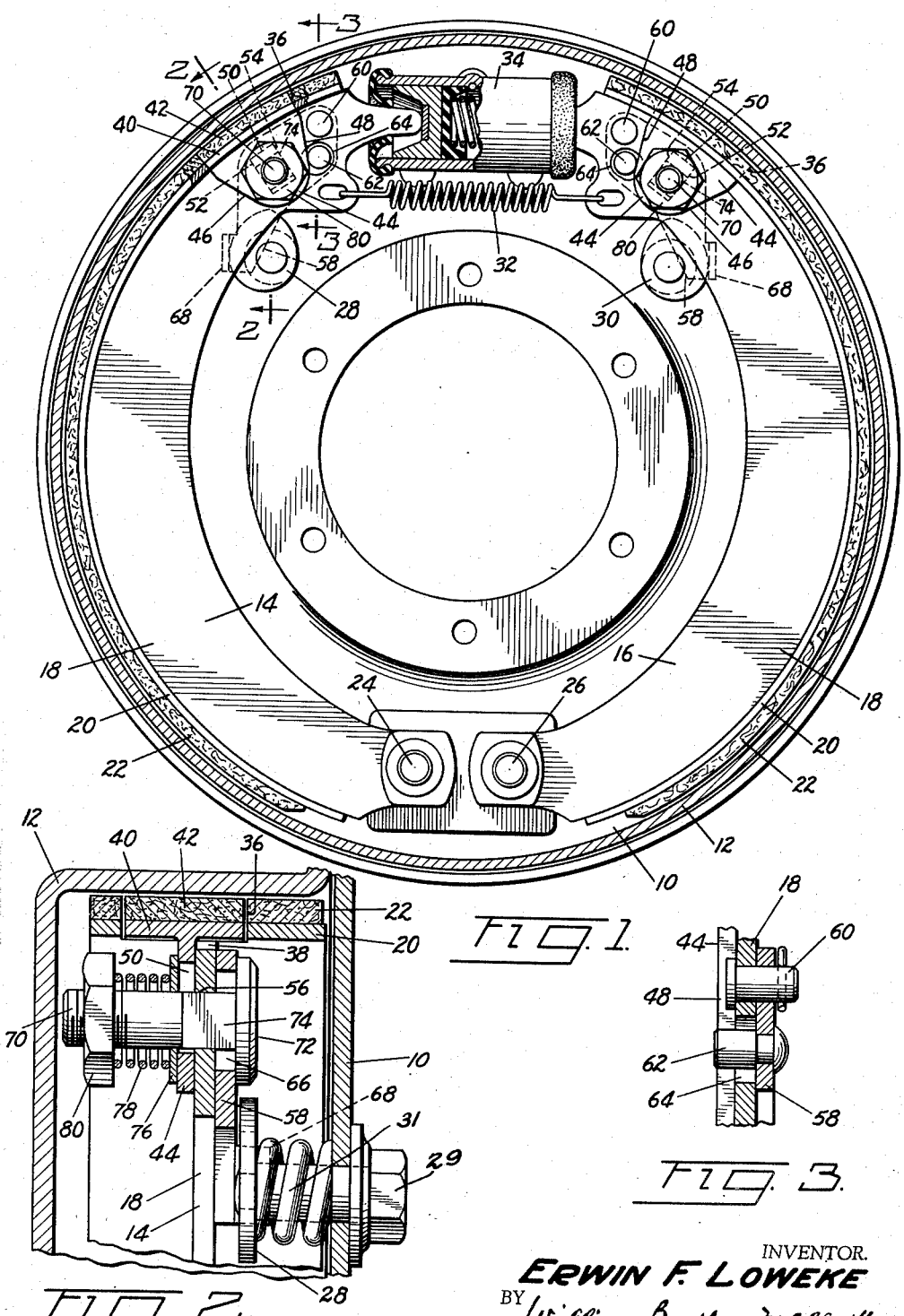
INVENTOR.
*ERWIN F. LOWEKE*
BY *Williams, Bradbury, McCaleb & Hinkle*
ATTORNEYS Patented Nov. 1, 1938

2,134,791

UNITED STATES PATENT OFFICE 2,134,791

BRAKE

Erwin F. Loweke, Detroit, Mich., assignor to Hydraulic Brake Company, Detroit, Mich., a corporation of California Application May 29, 1937, Serial No. 145,483

7 Claims. (Cl. 188—79.5)

This invention relates to brakes, and more particularly to adjusting means therefor.

Broadly the invention comprehends means for automatically adjusting the friction elements or shoes of an internal expanding brake so as to compensate for wear of the lining on the shoes.

Automatic adjusting devices for this purpose are well known to those conversant in the art and it is generally conceded that such devices have not proved entirely satisfactory. This is particularly true in that type of automatic adjusting devices wherein the function is dependent upon the wear of the lining on the shoes for control of a relative movement between the shoes and a member frictionally clamped to the shoes and arranged for cooperation with the drum and with adjustable stops for supporting the shoes in proper spaced relation to the drum when the brake is at rest.

Generally in this type of automatic adjusting devices considerable force is required to cause relative movement between the shoes and the members frictionally clamped to the shoes because of the tension of the retractile springs connecting the shoes acting as an opposing force to the frictional resistance to movement of the members. It therefore follows that the frictional resistance to movement of the members must of necessity overcome the load on the retractile springs; otherwise, the brake would be underadjusted. The present invention aims to overcome this objection.

An object of the invention is to provide means for automatically adjusting the friction elements of a brake to compensate for wear of the lining on the shoes.

Another object of the invention is to provide an automatic adjusting device for the friction elements of the shoes operative in such a manner as to avoid mal-adjustment of the friction elements.

Another object of the invention is to provide an automatic adjusting device for the friction elements of a brake operative to effectively avoid underadjustment of the friction elements.

A feature of the invention is a member clamped to the friction elements and movable relative thereto and cooperating with a stop for supporting the elements in proper spaced relation to a rotatable drum and means interposed between the member and stop limiting movement of the member in one direction only.

Other objects and advantages of the invention will more fully appear from the following description taken in connection with the drawing forming a part of this specification, and in which,—

Fig. 1 is a vertical sectional view of a brake taken just back of the head of the drum illustrating the invention as applied;

Fig. 2 is a sectional view substantially on line 2—2, Fig. 1; and

Fig. 3 is a sectional view substantially on line 3—3, Fig. 1.

Referring to the drawing for more specific details of the invention, 10 represents a fixed support or backing plate. Associated with the backing plate is a rotatable drum 12, and a pair of corresponding interchangeable friction elements or shoes 14 and 16 are mounted on the backing plate for cooperation with the drum. The shoes are of conventional type each including a web 18 supporting a rim 20 to which is suitably secured a friction lining 22.

The shoes 14 and 16 have their articulate ends pivotally mounted on spaced anchors 24 and 26 positioned on the backing plate, and corresponding adjustable retractile stops 28 and 30 also positioned on the backing plate support the shoes in proper spaced relation to the drum when the brake is at rest, and a retractile spring 32 connecting the shoes 14 and 16 serves to return the shoes to the stops 28 and 30 upon conclusion of a braking operation and to retain the shoes upon the stops when the brake is at rest. Each stop is riveted to the end of a bolt 29 and is provided with a spring 31 for frictionally holding its stop in any adjusted position.

A fluid pressure actuated motor 34 of any conventional type mounted on the backing plate between the shoes 14 and 16 and adapted to be connected to a suitable source of fluid pressure is operative to actuate the shoes into engagement with the drum against the resistance of the retractile spring 32.

Each shoe has a rectangular opening 36 extending through its rim 20 and lining 22 preferably adjacent the force applying end of the shoe, and that portion of the web 18 of the shoe immediately beneath the opening is cut away to provide a slot 38. A reversible block 40, fitted for movement in the opening 36 and the slot 38, has on its face a friction lining 42 which may be of a lower coefficient of friction than the friction lining 22 on the rim 20 of the shoe, and depending from the back of the block is a flange 44 slidably engaging the web 18 of the shoe.

The ends of the flange 44 are inclined toward one another as indicated at 46 and 48, and arranged centrally of the flange between the inclined edges 46 and 48 in a plane normal to the block 40 is a slot 50. The perimeter of the flange defining this slot has parallel portions 52 and 54 disposed respectively in annular relation to the inclined ends 46 and 48 of the flange 44, and the slot 50 registers with a similar but smaller opening 56 in the web of the shoe.

A lever 58 pivoted on the web 18 of the shoe as indicated at 60 carries a pin 62. This pin extends through an opening 64 in the web 18 of the shoe and engages the inclined edge 48 of the flange 44 depending from the back of the block 40. The lever has an opening 66 registering with, but of greater diameter than, the opening 56 in the web 18 of the shoe, and on the free end of the lever is a driver 68 normally engaging the adjustable retractile stop 28.

A bolt 70 having a large head 72 and oppositely disposed flats 74 on its body passes through the opening 66 in the lever, the opening 56 in the shoe, and the slot 50 in the flange 44 depending from the block 40. The head of this bolt is sufficiently large to bridge the opening 66 in the lever 58 and to bear against the lever, and the diameter of the bolt is smaller than the diameter of the opening 66 so as to provide for free movement of the lever. The body of the bolt has a snug fit in the opening 56 in the shoe and the flats 74 inhibit rotation of the bolt in the shoe.

The flats 74 on the bolt also engage the parallel portions 52 and 54 defining the slot 50 in the flange 44 on the back of the block 40 so that the flange may slide smoothly on the bolt in a radial direction with respect to the brake. A washer 76 sleeved on the bolt bears against the flange 44, and a spring 78 also sleeved on the bolt between the washer and a nut 80 threaded on the end of the bolt serves to retain the block 40 and lever 58 in assembled position on the rim 18 of the shoe, also to eliminate chatter and to avoid movement of the assembly due to vibrations in the brake. The spring 78 also serves frictionally to clamp lever 58 in any adjusted position.

In a normal operation, upon actuation of the motor 34 the shoes 14 and 16 are moved into engagement with the drum 12 against the resistance of the retractile spring 32 effectively retarding rotation of the drum. During this operation the respective assemblies of the blocks 40, the lever 58, and the shoes 14 and 16 move as a unit.

The microscopic wear of the lining on the shoes during each engagement of the shoes with the drum results in further movement of the shoes into the drum. Since the unit pressure on the blocks 40 is low in comparison with the unit pressure on the shoes 14 and 16, there is substantially no wear of the lining on the block as compared with the wear on the lining of the shoes. This results in relative movement between the respective blocks 40 and shoes 14 and 16.

The movement of the blocks 40 is restricted in paths radially of the drum, and the inclined edges 48 on the flanges 44 depending from the blocks 40 are angularly disposed to the path of movement of the blocks, and the edges 48 are engaged by the pins 62 on the levers 58; hence there is a wedging action resulting in movement of the levers 58 about the fulcrums 60 to such positions that when the brake is released the levers engage the stops 28 and 30 so as to support the shoes in proper spaced relation to the drum. The lever 58 associated with the brake shoe 14 is moved in a counter-clockwise direction by the inward radial movement of its block 40, whereas the lever 58 associated with the brake shoe 16 is moved in a clockwise direction by the inward movement of its block 40. Because of the wedging action introduced by the radial movement of the blocks 40 and the inclined edges 48, but little pressure is required to move the blocks 40 inwardly, whereas outward movement of the blocks 40 is inhibited by the frictional resistance created by the spring 78. Thus the tension on the retractile springs 32 connecting the shoes does not tend to force the blocks outward and underadjustment of the shoes due to the tension on the retractile springs is avoided.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,—

1. A brake comprising a friction element, a retractile stop associated therewith, a member carried by and movable radially to the element having a part angularly disposed to the path of movement of the member, and a lever carried by the element having a part engaging the angularly disposed part and another part adapted to engage the stop.

2. A brake comprising a rotatable drum, a friction element having a lining for cooperation with the drum, a retractile stop for the friction element, a member carried by the friction element and movable radially thereto having a part angularly disposed to the path of movement of the member, and a lever pivoted on the friction element having a part engaging the angularly disposed part on the member and another part adapted to engage the stop.

3. A brake comprising a rotatable drum, a friction element for cooperation with the drum, a retractile stop for the friction element, a member carried by and radially movable on the friction element cooperating with the drum and having a part angularly disposed to the path of movement of the member, and a lever carried by the friction element having a part engaging the angularly disposed part of the movable member and another part adapted to engage the stop.

4. A brake comprising a rotatable drum, a friction element having a lining for cooperation with the drum, a retractile stop for the friction element, a member carried by and movable radially to the friction element having a lining cooperating with the drum and a part angularly disposed to the path of movement of the member, and a lever pivoted on the friction element having a part engaging the angularly disposed part of the member and another part adapted to engage the stop.

5. A brake comprising a fixed support, a rotatable drum associated therewith, a shoe on the support having a lining for cooperation with the drum, a retractile stop for the shoe, a member carried by and movable radially on the shoe having a lining for cooperation with the drum and a part angularly disposed to the path of movement of the member, and a lever pivoted on the shoe having a part engaging the angularly disposed part of the member and another part adapted to engage the stop.

6. A brake comprising a fixed support, a rotatable drum associated therewith, a shoe on the support having a lining for cooperation with the drum, a retractile stop for the shoe, and means for actuating the shoe, a member carried by and movable radially on the shoe having a lining for cooperation with the drum and a part angularly disposed to the path of movement of the member, a lever pivoted on the shoe having a part adapted to engage the angularly disposed part on the member and another part adapted to engage the stop, and means retaining the member and lever on the shoe.

7. A brake comprising a fixed support, a rotatable drum associated therewith, a pair of shoes pivoted on the support for cooperation with the drum, retractile stops for the shoes, a retractile spring normally retaining the shoes on the stops and means for actuating the shoes, members carried by the respective shoes movable radially thereon, said members cooperating with the drum and having parts angularly disposed to their respective paths of movement, levers pivoted on the respective shoes having parts engaging the angularly disposed parts of the radially movable members and other parts adapted to engage the stops.

ERWIN F. LOWEKE.